United States Patent

[11] 3,581,670

| | | |
|---|---|---|
| [72] | Inventor | Allen R. Larivee<br>Mt. Clemens, Mich. |
| [21] | Appl. No. | 728,639 |
| [22] | Filed | May 13, 1968 |
| [45] | Patented | June 1, 1971 |
| [73] | Assignee | American Chain and Cable Company, Inc.<br>New York, N.Y. |

[54] ACCUMULATING AND PUSHER TOW TRUCK CONVEYOR SYSTEM
8 Claims, 3 Drawing Figs.

| | | |
|---|---|---|
| [52] | U.S. Cl. | 104/172, 104/170 |
| [51] | Int. Cl. | B65g 17/42, B65g 17/38 |
| [50] | Field of Search | 104/172 |

[56] References Cited
UNITED STATES PATENTS

| | | | |
|---|---|---|---|
| 3,467,023 | 9/1969 | Dodds et al. | 104/172 |
| 3,345,953 | 10/1967 | Schmidt | 104/172 |
| 3,415,200 | 12/1968 | Bishop et al. | 104/172 |

*Primary Examiner*—Arthur L. LaPoint
*Assistant Examiner*—Robert Saifer
*Attorney*—Barnes, Kisselle, Raisch and Choate ABSTRACT: A tow truck conveyor system comprising a plurality of tow trucks, each of which has a tow pin extending downwardly through a slot in a floor to engage a conveyor. Each tow truck has a movable front bumper that is operatively connected to the tow pin to raise the tow pin out of engagement with the conveyor upon encountering an obstacle or a preceding tow truck. Each tow truck further includes a rear bumper that is adapted to be held in its rearward position when the front bumper is moved rearwardly to cause the rear bumper to engage the front bumper of a succeeding tow truck. Each tow truck further includes a fixed rearwardly extending centrally located projection and a forwardly extending centrally located projection which are adapted to engage one another. The centrally located front projection is on the front accumulation bumper so that when the tow pin of a preceding carrier is in down position but not in engagement with the conveyor, the front bumper of a succeeding carrier to cause the tow pin of the succeeding carrier to be moved out of engagement with the conveyor.

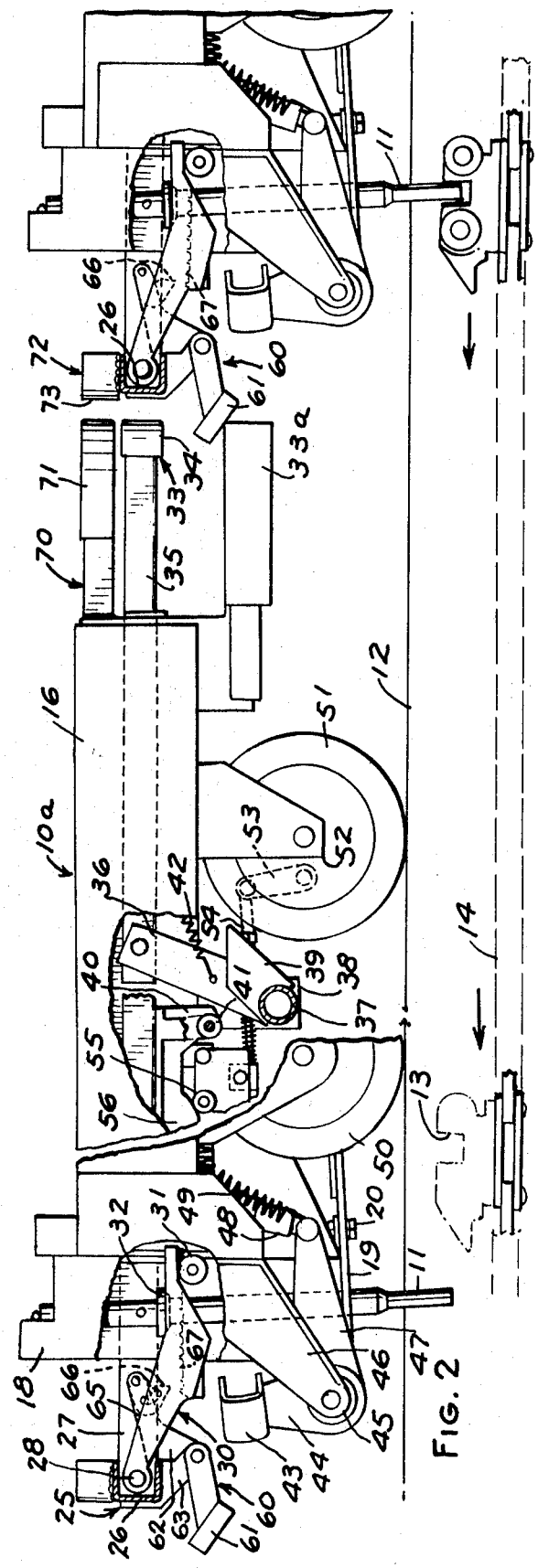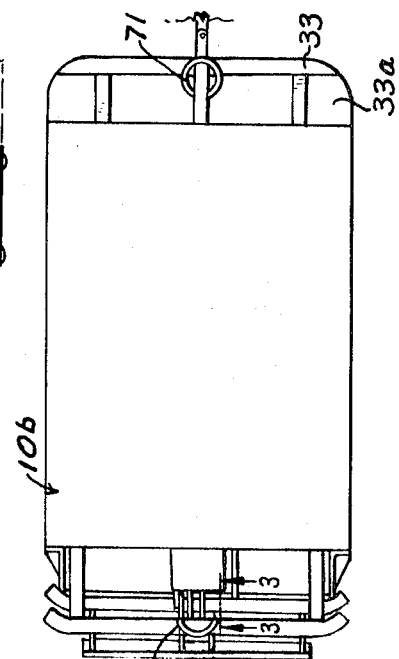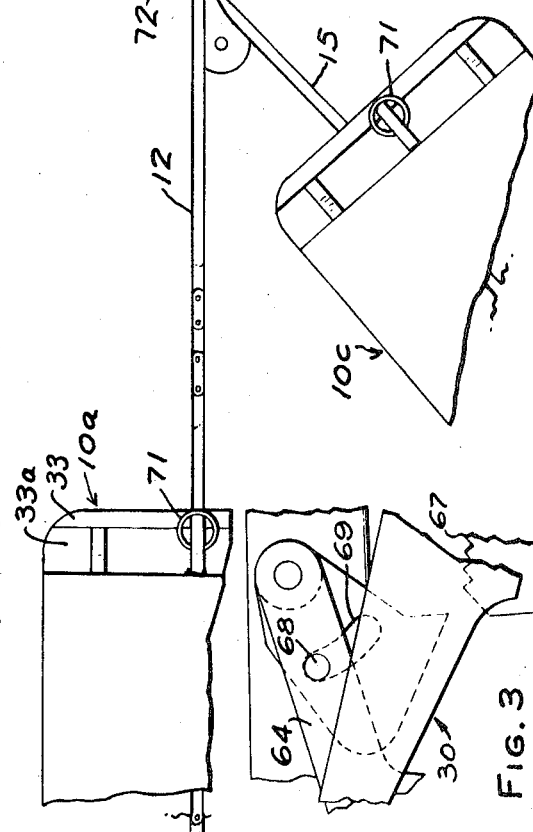
FIG. 1
FIG. 2
FIG. 3
INVENTOR.
ALLEN R. LARIVEE
BY
Barnes, Kisselle, Raisch & Choate
ATTORNEYS

ACCUMULATING AND PUSHER TOW TRUCK CONVEYOR SYSTEM

This invention relates to tow truck conveyor systems and particularly to accumulating and pusher tot truck conveyor systems.

Tow truck conveyor systems conventionally comprise a plurality of carriers or tow trucks having conveyor engaging means thereon such as a tow pin that extends downwardly through a slot in a floor for engagement with a main conveyor. Spur or transfer slots are provided at longitudinally spaced points along the floor so that when it is desired to move a tow truck off the main line or conveyor, it can be guided by the tow pin through the spur or transfer slot. It is common to provide an accumulation bumper at the front of the carrier which is operatively connected to the tow pin to lift the tow pin in the event that the tow truck encounters an obstacle. Such an accumulating system is shown in the U.S. patents to Botley Ser. No. 2,234,620 and Rainier Ser. No. 2,619,916. Where the tow trucks are diverted to a spur or transfer slot, it is often desirable that a succeeding tow truck push the diverted tow truck clear of the main conveyor line or push one or more tow trucks along the transfer slot. It has heretofore been suggested that various systems might be utilized to achieve this purpose.

In the opening patent application of Gerald C. Dodds, Karl R. M. Karlstrom and Werner W. Kort, Ser. No. 593,412 filed Nov. 10, 1966 and having a common assignee with the present application, now issued as U.S. Pat. No. 3,467,023, a structure is provided wherein when the front bumper engages an obstacle, the rear bumper is moved into position for engagement by the front bumper of a succeeding tow truck so that the succeeding tow truck will be interrupted in its movement and have its tow pin elevated by the engagement of the front bumper of the succeeding tow truck with the rear bumper of the preceding tow truck. Normally, if the preceding tow truck does not encounter an obstacle and the rear bumper has not been held rearwardly, a succeeding carrier will engage a fixed bumper on the preceding tow truck to push it along, for example, along a spur or transfer slot. Occasionally, the tow pin of a preceding carrier will be in the downward position but will not be in engagement with the conveyor until a pusher on the conveyor comes into proper position. A succeeding carrier would thus normally push this preceding carrier. It is desirable, however, to provide a construction wherein when the tow trucks are along the same line and such a condition exists, the succeeding carrier will have its front bumper moved to lift its tow pin out of engagement with the conveyor.

Among the objects of the invention are to provide a tow truck conveyor system wherein the succeeding tow truck will accumulate when the preceding tow truck is stopped with its tow pin in the downward position; which system is relatively simple and low in cost.

In the drawings:

FIG. 1 is a fragmentary plan view of a system embodying the invention.

FIG. 2 is a fragmentary part sectional longitudinal view of a system embodying the invention.

FIG. 3 is a fragmentary side elevational view on an enlarged scale taken along the line 3—3 in FIG. 1.

Referring to FIGS. 1 and 2, the tow truck conveyor system embodying the invention comprises a plurality of wheeled tow trucks 10, each of which has a vertically reciprocable tow pin 11 adjacent the front end thereof that extends downwardly through a slot 12 in the floor and is engaged by a lug 13 on a conveyor chain 14 which is driven beneath the floor to pull the tow truck along the slot 12. At various points along the length of the slot 12, spur or branch slots 15 are provided into which the tow truck may be diverted upon signal in accordance with the requirement of the particular installation of the tow truck conveyor system.

In accordance with the invention, it is required that the tow pin 11 be elevated in the event that a tow truck 10a encounters an obstacle or a preceding carrier. Succeeding tow trucks 10b must have their tow pins 11 elevated as they successively encounter a preceding truck. In addition, it is required that in the event a tow truck 10c has its tow pin 11 in a branch slot and a portion of the tow truck projects into the path of the main slot, the succeeding tow truck 10b will push the preceding tow truck 10c along the branch slot and out of the path of the succeeding truck 10b.

As shown in FIGS. 1 and 2, the tow truck 10 includes a body 16 that is generally rectangular. The tow pin 11 is mounted for vertical sliding movement in an opening (not shown) of a tow pin mounting bracket 18 fixed on the front end of the body 16. The lower end of the tow pin 11 extends through a slot in a link 19 that is slidably mounted for movement longitudinally of the tow truck on the lower end of the bracket 18 by a bolt 20 that extends through an elongated slot in the link. The link 19 is connected by a pair of tension springs (not shown) to the body of the truck. The arrangement is such that the springs provide for some limited yielding movement of the tow pin 11 when the lug 13 on the conveyor chain 14 engages the tow pin 11 to thereby minimize the shock. A shock absorber extends between the link 19 and the body 16. The shock absorber is interrelated with the function of the springs to minimize the shock as disclosed and claimed in the U.S. Pat. to Klamp, Ser. No. 3,015,284.

A front accumulation bumper assembly 25 is slidably mounted at the front end of the body of the truck 10 and includes a front accumulation bumper 26 which extends transversely of the tow truck substantially across the entire width thereof and longitudinally extending tubes 27 that are welded to the front accumulation bumper 26 and extend rearwardly through slots in the front wall of the body 16. Rollers (not shown) guide the movement of the tubes 27. A spring yieldingly urges the front accumulation bumper assembly forwardly.

A horizontal cross pin 28 is journaled on the front accumulation bumper 26 and a tow pin cam 30 comprising a pair of interconnected vertical plates is fixed thereto and extends rearwardly. Each plate of the cam 30 has a cam surface successive portions of which engage rollers 31 rotatably mounted about horizontal axes on the bracket 18. The upper surfaces of the plates of the cams 30 are engaged by a collar 32 on the tow pin 11. As the front accumulation bumper 26 encounters an obstacle or a preceding tow truck, the front accumulation bumper 26 is pushed rearwardly causing the surfaces of cams 30 to successively engage the rollers 31 and thereby swing the arms 30 in a counterclockwise direction as viewed in FIG. 1 to move the collar 32 and in turn the tow pin 11 upwardly raising the tow pin 11 out of engagement with the lug 13 of the main conveyor 14.

Each tow truck 10 includes a fixed rear bumper 33a that extends across the rear of the tow truck transversely substantially across the entire width and rearwardly beyond the rear end of the main body 16 and at a level vertically below the level of the front accumulation bumper 26.

The tow truck 10 includes a movable rear accumulation bumper assembly 33 which includes a rear bumper 34 extending across the entire width of the body 10 and longitudinally extending tubes 35 which are welded to the rear bumper 34 and extend forwardly through openings in the rear wall of the body 26. Rollers (not shown) guide the movement of the tubes 35.

The forward ends of the tubes 35 are pivoted between the upper ends of pairs of levers 36 which in turn have their lower ends welded to a tube 37. The tube 37 is journaled by bearings on a rod which extends between brackets 38 that extend downwardly from the sides of the body 10.

A pair of cams 39 are fixed to the tube 37 and extend upwardly and generally rearwardly. Each cam 39 includes angularly related cam surfaces. Cam follower plates 40 are fixed to and extend downwardly from the side tubes 27 of the front accumulation bumper assembly 25. Each cam follower plate 40 has a roller 41 at the rear end thereof which is adapted to engage the cam surfaces of the cam 39, as presently described.

A spring 42 extends between one of the arms 36 and the body 16 to yieldingly urge the rear accumulation bumper assembly 33 rearwardly against resilient stop blocks (not shown).

As shown in FIGS. 1 and 2, the tow truck 10 further includes a shock absorbing and cushioning bumper 43 at the front end thereof which is at the same level as the fixed bumper 33a at the rear. Bumper 43 is fixed to brackets 44 which in turn are fixed to a tube 45 rotatably mounted between downwardly extending brackets 46 at the front end of the truck body 10. A lever 47 extends rearwardly from the tube 45 and a shock absorber 48 has one end thereof connected to the lever 47 and the other end thereof connected to the truck body 10. A spring 49 is also connected to the lever 47 at one end and to the truck body 10 at the other end. The shock absorber 48 has a high resistance in extending when the bumper 43 encounters an obstacle and a low resistance in collapsing.

Each tow truck 10 includes a pair of swiveled wheels 50 adjacent the front end thereof and fixed axle wheels 51 at the rear end thereof. The rear wheels are provided with expanding brakes 52 of generally conventional construction that are operated by movement of an arm 53 rearwardly. A rod 54 is pivoted at one end to the upper end of each arm 53. A cam follower roller 55 on a member connected by a rod to arm 53 is engaged by a downwardly and rearwardly inclined cam surface on a cam plate 56 when the front accumulation bumper 36 is moved rearwardly. This swings the brake arm 53 and engages the respective brake.

In order to maintain the front accumulation bumper 26 in a position to hold the tow pin 11 out of engagement with the main conveyor until the preceding tow truck has moved away from the front bumper 26, means are provided for insuring that slight movement of the preceding tow truck away from the tow truck will not permit the tow pin to be dropped. As shown, a positive latch mechanism 60 is provided on the front of the truck and comprises a tubular crossbar 61 that has rearwardly extending levers 62 thereon which are pivoted to brackets 63 on the front accumulation bumper 26. One of the levers 62 intermediate the ends of the bar 61 has a rearwardly extending portion on which a latch dog 65 is pivoted. The latch dog 65 extends forwardly and is biased downwardly by its own weight. The latch dog 65 includes a downwardly extending tooth 66 that is adapted to engage one of a plurality of teeth on a rack bar 67 which is fixed on the bracket 18 and extends forwardly. A pin 68 on the lever portion 64 extends through an arcuate slot 69 in the latch dog 65. By this arrangement, when the crossbar 61 is swung counterclockwise, the pin 68 on the lever portion 64 engages the uppermost portion of slot 69 to lift the latch dog 65 out of engagement with the rack 67.

When a tow truck encounters a preceding truck that has been stopped by an obstacle, the front accumulation bumper 26 will engage the near accumulation bumper 34 of the preceding truck and the crossbar 61 will ride onto the top surface of the fixed bumper 33a. As the truck moves forwardly, the front accumulation bumper 26 will move rearwardly to lift the tow pin 11 and the weight of the latch dog 65 will cause the dog to engage one of the teeth of the rack bar 67. In this manner, the tow pin 11 will be locked into position out of engagement with the main conveyor. When the preceding truck has moved away, then the weight of the crossbar 61 will bias the crossbar downwardly thereby swinging the latch dog 65 out of engagement with the rack 67 to permit the front accumulation bumper 26 to move forwardly and, in turn, the tow pin 11 to drop down into engagement with the main conveyor.

If the tow truck shown in FIG. 1 encounters an obstacle, the front accumulation bumper 26 will move rearwardly causing the tow pin cam 35 to swing counterclockwise and lift the tow pin 11 out of engagement with the main conveyor. The movement of the front accumulation bumper 26 rearwardly will also cause cam follower rollers 41 to engage the surface of the cam 39 and thereby hold the rear accumulation bumper 34 in position for engagement by the front accumulation bumper of a succeeding tow truck.

The rearward movement of the front accumulation bumper 26 also causes the cam plates to engage the brake actuating cam follower rollers to engage the brakes.

As a succeeding tow truck approaches the preceding tow truck that has been stopped, the front accumulation bumper 26 of the succeeding tow truck will engage the rear accumulation bumper 34 of the preceding tow truck and the front accumulation bumper 26 will be moved rearwardly to lift the tow pin because the rear accumulation bumper 34 of the preceding tow truck has been locked in its rear position. At the same time, crossbar 61 will be swung clockwise onto the top surface of the fixed bumper of the preceding truck permitting the latch dog 65 to engage the rack bar 67 and thereby lock the tow pin in raised position. The movement of the front accumulation bumper 26 rearwardly will in turn hold rear accumulation bumper 34 of the succeeding truck in position for engagement by the front accumulation bumper of a further succeeding carrier and engage the brakes of the tow truck.

When the obstacle to the first tow truck is removed, the tow pin of that tow truck will drop downwardly into the slot 12, and, as the lug of the main conveyor approaches, the lug will pick up the tow pin and move the tow truck along the slot. As the first tow truck is moved away from the next succeeding tow truck, the crossbar 61 of the succeeding tow truck will be permitted to swing counterclockwise to disengage the latch dog 65 from the rack bar 67 permitting the tow pin 11 to drop and the brakes of the succeeding tow truck to be disengaged so that the succeeding tow truck can be picked up by a lug on the main conveyor. Each succeeding tow truck will have its tow pin dropped in succession.

Any continued movement of a tow truck due to its momentum brings the shock absorbing bumper 43 into engagement with the fixed bumper 33a so that the full shock and load of the stoppage of the tow truck is taken up by the shock absorbing bumper and the associated linkage.

In accordance with the invention, each tow truck is provided with a centrally located axially and rearwardly extending projection 70 which has a substantially vertical cylindrical outer surface 71. Similarly, each front accumulation bumper is provided with an arcuate forwardly extending centrally located projection 72 that has a substantially vertical cylindrical outer surface 73 having substantially the same diameter as cylindrical surface 71. The projections 70, 72 are longitudinally aligned. The circumferential extent of surface 71 is slightly less than 360° while the circumferential extend of surface 73 is slightly less than 180°. Thus, as shown in FIG. 1, if the tow truck 10a has been stopped and the obstacle in front of the tow truck has been removed, the tow pin will be in its downward position (FIG. 2). As a succeeding tow truck 10b is moved by the conveyor toward the tow truck 10a, the projection 72 on the front bumper 26 will engage the projection 70 to move the front bumper 26 rearwardly and elevate the tow pin of the second tow truck 10b out of engagement with the conveyor to stop the tow truck 10b. If, however, in moving across a branch slot, the tow truck 10b encounters a tow truck 10c which has been stopped in its movement in the branch slot, the movable bumper front bumper 43 of the tow truck 10b will engage the fixed bumper 33a of the tow truck 10c and move it out of the path of the tow truck 10b, the projections 70, 72 of the tow trucks 10b, 10c being out of alignment for engagement and therefore not interfering with such pushing motion.

I claim:
1. In a carrier, the combination comprising a body,
means for supporting said body for movement along a path,
a front accumulation bumper,
means for movably mounting said accumulation bumper at the front end of said body,
means on said body operable by said front accumulation bumper when said front accumulation bumper is engaged by an obstacle and moved a predetermined minimum distance relative to said body to disengage an operating connection with a conveyor, a rear accumulation bumper, means for movably mounting said rear accumulation bumper at the rear end of said body for movement from a predetermined position where said rear accumulation bumper is engageable by a front accumulation bumper of a succeeding carrier and if held in said predetermined position will move the front accumulation bumper of a succeeding carrier to disengage said operating connection, to a position where said rear accumulation bumper will not move the front accumulation bumper of a succeeding carrier, means between said front accumulation bumper and said rear accumulation bumper operable in such a manner that when said front accumulation bumper engages an obstacle, said front accumulation bumper is moved and, in turn, holds said rear accumulation bumper in said predetermined position relative to said body where it is engageable by a front accumulation bumper of a succeeding carrier to move said front accumulation bumper of the succeeding carrier and, in turn, the disengage the operating connection of a succeeding carrier, a rearwardly extending centrally located projection fixed on the rear of each said body, a forwardly extending centrally located projection on each said front accumulation bumper, each of said projections having surfaces which are arcuate in horizontal cross section, said rearwardly and forwardly extending projections being aligned and adapted to engage one another when said carriers are aligned, whereby when said conveyor engaging means on a preceding carrier is in position for engagement with a conveyor and a succeeding carrier is moved toward the preceding carrier with the preceding carrier and succeeding carrier in alignment, the forwardly extending projection of the succeeding carrier will engage the rearwardly extending projection of the preceding carrier to move said front accumulation bumper of the succeeding carrier to disengage the operating connection between the succeeding carrier and the conveyor, and when a succeeding carrier is moved toward the preceding carrier with the succeeding carrier out of alignment with the preceding carrier, the succeeding carrier will push the preceding carrier without disengaging the operating connection between the succeeding carrier and the conveyor.

2. The combination set forth in claim 1 wherein said arcuate surfaces form portions of a cylinder.

3. The combination set forth in claim 2 wherein said cylindrical surface of said forward projection has a circumferential extent of about 180° and said cylindrical surface of said rearward projection has a circumferential extent of about 360°.

4. The combination set forth in claim 2 wherein said surfaces are of substantially the same diameter.

5. In a tow truck, the combination comprising a body, wheels on said body for supporting said body for movement along a path, a front accumulation bumper, means for mounting said accumulation bumper at the front end of said body for movement longitudinally of said body, a tow pin mounted on said body for substantially vertical movement and operable by said front accumulation bumper when said front accumulation bumper is engaged by an obstacle and moved a predetermined minimum distance relative to said body to lift said tow pin and disengage the tow pin from a conveyor, a rear accumulation bumper, means mounting said rear accumulation bumper at the rear end of said body for movement longitudinally of said body from a predetermined position where said rear accumulation bumper is engageable by a front bumper of a succeeding tow truck and if held in said predetermined position will move the front accumulation bumper of a succeeding carrier to disengage said operating connection, to a position where said rear accumulation bumper will not move the front accumulation bumper of a succeeding tow truck, means between said front accumulation bumper and said rear accumulation bumper operable in such a manner that when said front accumulation bumper engages an obstacle, said front accumulation bumper holds said rear accumulation bumper in said predetermined position relative to said body where it is engageable by a front accumulation bumper of a succeeding tow truck to move said front accumulation bumper of the succeeding tow truck and, in turn, disengage the operating connection of a succeeding tow truck, a rearwardly extending centrally located projection fixed on the rear of each said body, a forwardly extending centrally located projection in each said front accumulation bumper, each of said projections having surfaces which are arcuate in horizontal cross section, said rearwardly and forwardly extending projections being aligned and adapted to engage one another when said carriers are aligned, whereby when said conveyor engaging means on a preceding carrier is in position for engagement with a conveyor and a succeeding carrier is moved toward the preceding carrier with the preceding carrier and succeeding carrier in alignment, the forwardly extending projection of the succeeding carrier will engage the rearwardly extending projection of the preceding carrier to move said front accumulation bumper of the succeeding carrier to disengage the tow pin of the succeeding carrier from the conveyor, and when the succeeding carrier is moved toward the preceding carrier with the succeeding carrier out of alignment with the preceding carrier, the succeeding carrier pushes the preceding carrier without disengaging the tow pin of the succeeding carrier from the conveyor.

6. The combination set forth in claim 5 wherein said arcuate surfaces form portions of a cylinder.

7. The combination set forth in claim 6 wherein said cylindrical surface of said forward projection has a circumferential extent of about 180° and said cylindrical surface of said rearward projection has a circumferential extent of about 360°.

8. The combination set forth in claim 6 wherein said surfaces are of substantially the same diameter.